H. J. BECKER.
CHICKEN FEEDER AND EXERCISER.
APPLICATION FILED OCT. 9, 1912.
1,144,929.
Patented June 29, 1915.
4 SHEETS—SHEET 1.
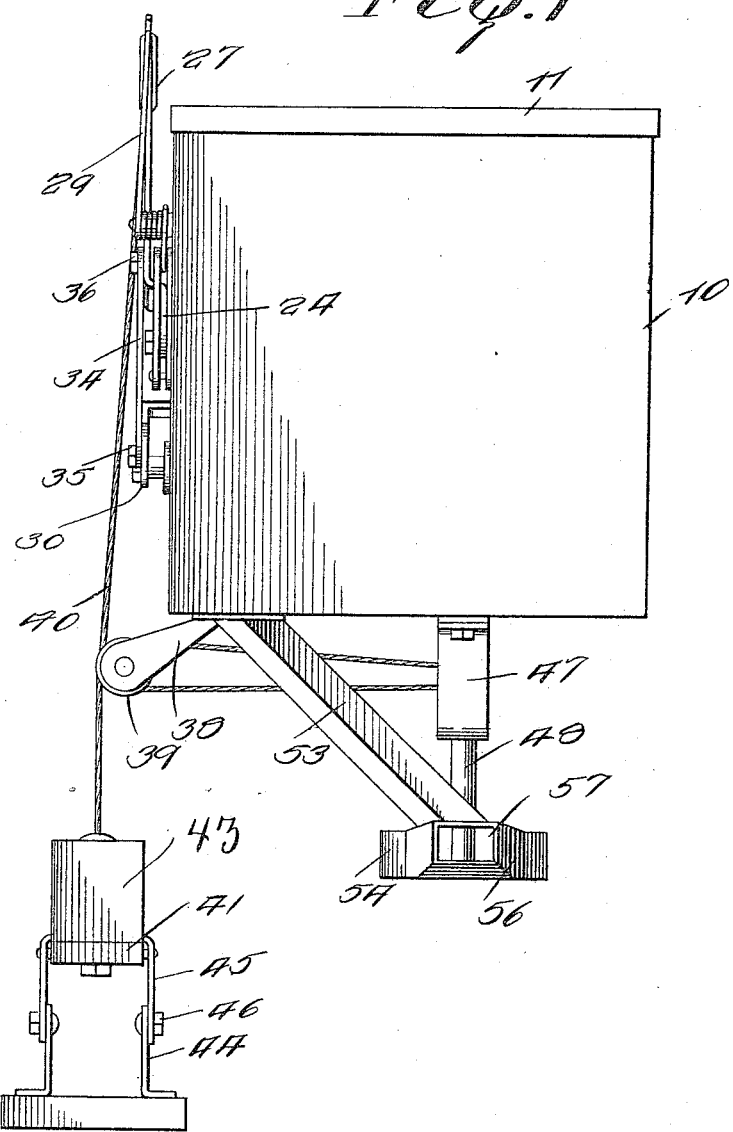
Witnesses
B. L. Brann
H. M. Test
Inventor
H. J. Becker
By Chandler & Chandler
Attorneys

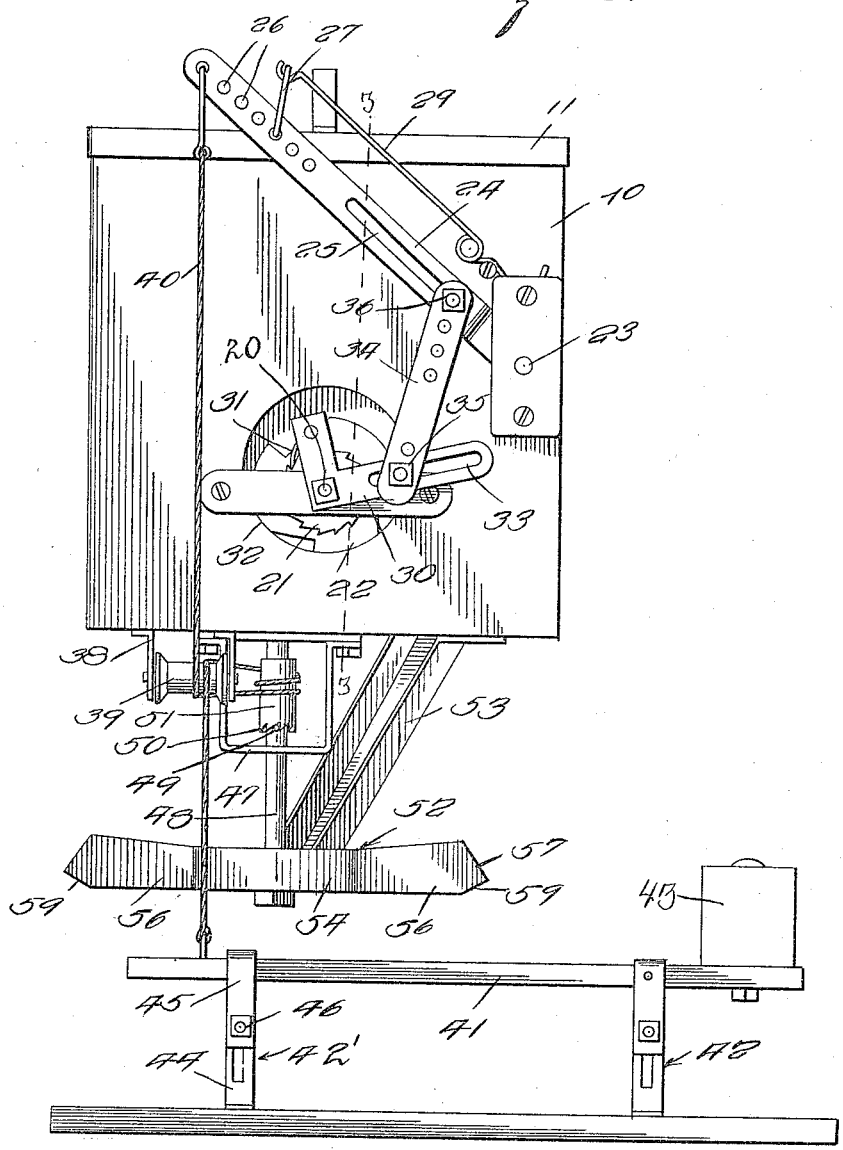

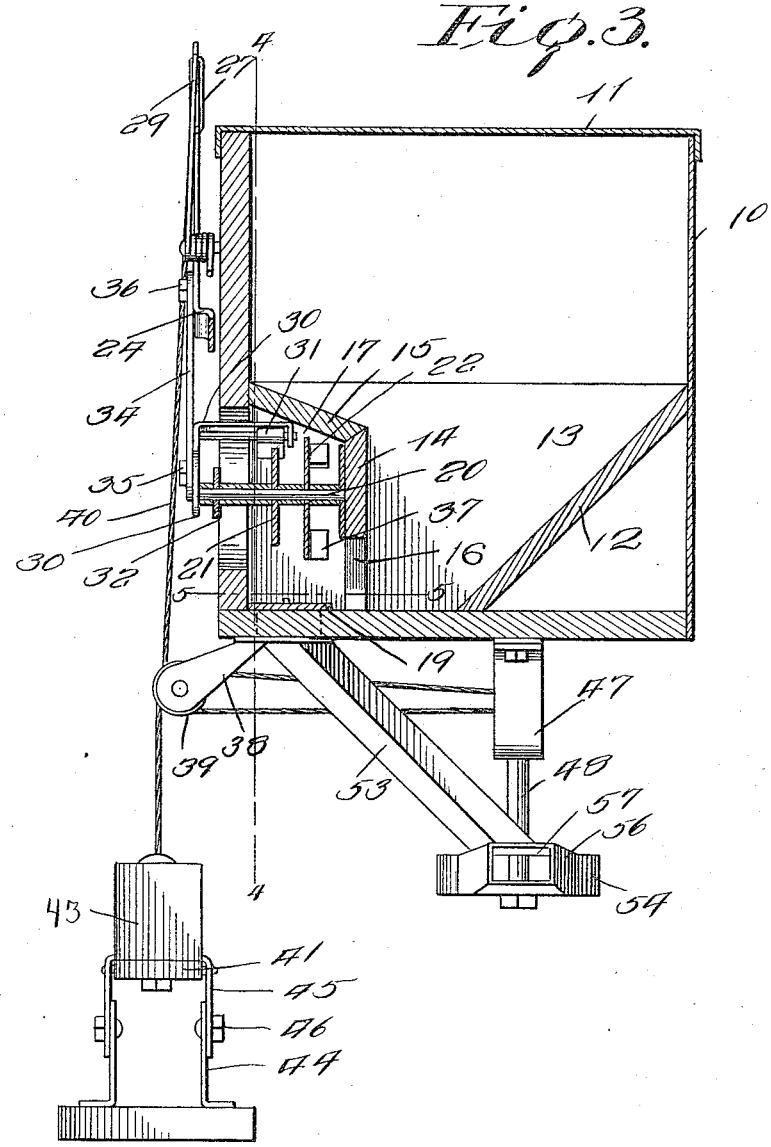

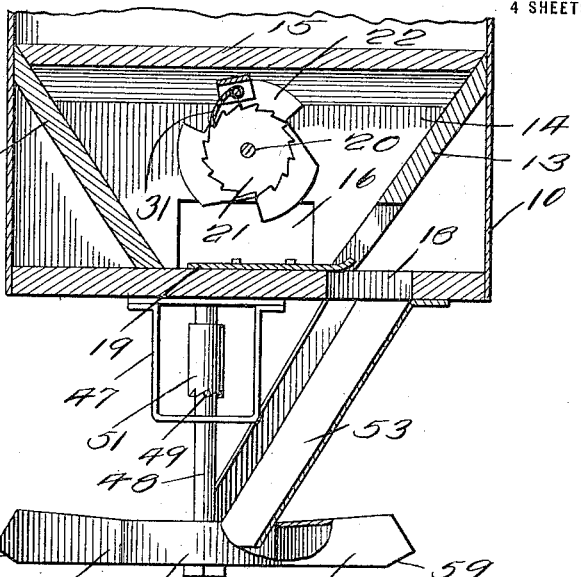
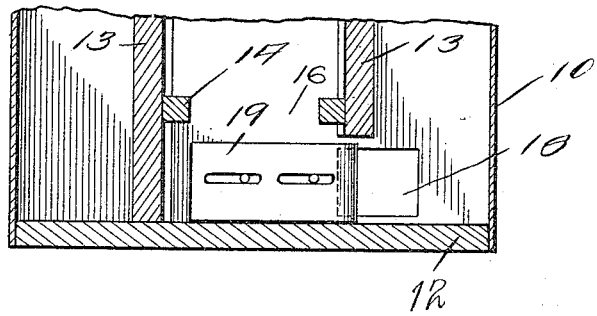
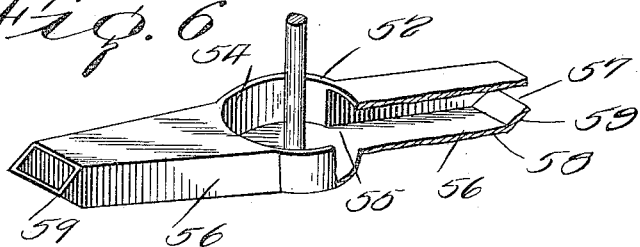

UNITED STATES PATENT OFFICE.

HARRY J. BECKER, OF NORTHAMPTON, PENNSYLVANIA.

CHICKEN FEEDER AND EXERCISER.

1,144,929. Specification of Letters Patent. Patented June 29, 1915.

Application filed October 9, 1912. Serial No. 724,809.

*To all whom it may concern:*

Be it known that I, HARRY J. BECKER, a citizen of the United States, residing at Northampton, in the county of Northampton, State of Pennsylvania, have invented certain new and useful Improvements in Chicken Feeders and Exercisers; and I do hereby declare the following to be a full, clear, and exact description of the invention, such as will enable others skilled in the art to which it appertains to make and use the same.

This invention relates to poultry feeders and exercisers and has particular reference to automatic devices of this character.

The principal object of the invention is to provide a device of this character wherein feed is drawn from the hopper by means of the weight of the fowl, and the feed scattered over a wide area.

Another object is to provide a device of this character in which the rate of flow of the feed may be regulated.

Other objects and advantages will be apparent from the description and with particular reference to the drawings.

In the drawings: Figure 1 is a side elevation of the device. Fig. 2 is a front view. Fig. 3 is a vertical sectional view on the line 3—3 of Fig. 2. Fig. 4 is a vertical sectional view on the line 4—4 of Fig. 3. Fig. 5 is a horizontal sectional view on the line 5—5 of Fig. 3. Fig. 6 is a detail of the throwing or scattering element.

Referring particularly to the accompanying drawings 10 represents a box which is adapted to be mounted or suspended from a suitable support, and provided with a removable lid 11 in the upper end. Within the box is a downwardly and forwardly inclined wall 12, and meeting this wall and inclined toward the end of the bottom of the box are the inclined walls 13. In the forward portion of the box is a vertical wall 14, which is suitably spaced from the front wall of the box, as clearly shown, and connected to the front wall of the box by the other inclined wall 15. The said inclined walls form the bottom of a hopper which contains the feed to be distributed by mechanism to be later described, the said wall 14 having an opening 16 in its bottom to permit the feed to pass from the hopper into the space between said wall and the front wall of the box. In the bottom of the box, and within the said space indicated by the reference character 17, is an outlet opening 18, said opening being disposed out of line with the opening 16, for a purpose to be referred to later, an adjustable slide 19 being mounted for movement over the opening 18 to regulate the amount of feed which passes through said opening.

Extending through the compartment 17, and journaled in the front wall of the box and in the wall 14, above the opening 16 is a shaft 20, and on this shaft are mounted a ratchet wheel 21 and a scattering or feeding disk 22 said ratchet or disk being rotatable with the said shaft. Pivotally mounted on the front wall of the box, and on the outside thereof, at 23, is a lever 24, said lever having formed therein an elongated slot 25 and at the outer end of said lever are formed openings 26.

Engaged in one end of the openings 26 is a loop or link 27, which is detachably engaged with the hook end of one arm of the spring 29, the other end of said spring being secured to the front wall of the box, adjacent the pivotal end of the lever 24.

As will be readily understood this spring holds the lever 24 normally in elevated position. Loosely mounted on the outer end of the shaft 20 is a bell-crank lever 30, one arm of said bell-crank lever carrying a pawl 31, said pawl and the portion of the angle plate 30 which carries it being disposed through an opening 32 in the front wall of the box, so that said pawl will engage the teeth of the ratchet wheel 21. The other arm of the bell-crank lever is provided with a longitudinal slot 33, one end of the link 34 being adjustably engaged therewith by means of a bolt 35, the other end of said link being adjustable in the slot of the lever 24 by means of the bolt 36.

When the lever 24 is swung downwardly on its pivot, the link 34 will rock the plate 30 on the shaft 20 and cause the pawl 31 to slide over the teeth of the ratchet wheel 21. Upon release of the lever 24, the spring 29 will return said lever to elevated position, and in doing so cause the pawl to engage and rotate the ratchet wheel and shaft so that the disk 22 will be rotated. This disk 22 has a series of laterally extending plates 37 which agitate the feed which falls through the opening 16 on the plate 19, and throws the same over the end plate 19 so that it will fall through the opening 18. Depending from the bottom of the box 10 is a yoke-shaped bracket 47 which supports the vertical shaft 48, this shaft being provided with a cross pin 49 for engagement with the teeth 50 on the sleeve 51 loosely mounted on the shaft above the pin.

Mounted in suitable brackets 38, beneath the box is a spool or roller 39, and secured at one end to the upper end of the lever 24 is a cord 40, which is passed under the spool, around a sleeve 51, back over the spool, and has its other end attached to one end of a pivoted bar 41. This bar 41 is mounted in an adjustable support 42, a suitable weight 43 being mounted on the other side of its pivot point to normally retain in elevated position the end which carries the cord 40. This support 42 as well as a support 42' comprises a pair of vertical slotted members 44 over which is placed a yoke 45, bolts 46 being passed through the arms of the yoke and the slots so that the yoke may be moved upwardly and downwardly on the vertical members 44. The cord attached end of the bar 41 engages the cross portion of the yoke and limits its upward movement.

Depending from the bottom of the box 10 is a yoke shaped bracket 47 which supports a vertical shaft 48, this shaft being provided with a cross pin 49 for engagement with the teeth 50 on the sleeve 51 loosely mounted on the shaft above the pin. The cord 40 is brought down from the end of the lever 24, passed around the spool 39, then passed several times around the sleeve 51, then back over the spool 39, and down to the end of the bar 41. Thus the spool 39 acts as a guide to direct the cord to the sleeve 51, said spool 39 being positioned in front of and below the front wall of the box while the shaft 48 is located under the box to the rear. On the lower end of the shaft 48 is rigidly mounted a throwing or scattering pan 52 which receives the feed from the opening 18 by means of a chute 53. This throwing device comprises a central cylindrical receiving portion 54 having openings 55 on opposite sides thereof and the discharging spouts 56 connected to the receptacle 54 and receiving the feed through the openings 55. The lower end of the chute 53 discharges the feed into the said receptacle 54, as the throwing device is rotated.

The spouts 56 are inclosed, and have the discharge openings in their outer end at 57, the outer end of the lower wall 58 of each of the spouts being slightly upturned at 59 to produce an upward throw to the feed so as to assist in throwing the feed to a greater distance.

The operation of the said device may be briefly described as follows: A chicken steps on the rod or bar 41, and his weight overcoming the weight 43 causes the bar to descend. The descension of the bar pulls on the cord 40 so that the sleeve 51 is rotated, the teeth ratcheting idly over the pin 49. At the same time, the cord 40 pulls the lever 24 downwardly on its pivot and causes it to rock the bell crank lever 30 on the shaft 20. The pawl 31 will also be drawn idly over the teeth of the ratchet wheel 21. When the parts move to normal position under the influence of the spring 29, the pawl will engage the teeth and rotate the shaft 20. The return of the lever 25 to normal upward position causes the engagement of the teeth of the sleeve 51 with the pin 49 and the consequent rotation of the shaft 48. This rotation of the shaft causes the throwing device 52 to scatter the feed over a considerable area, the feed being discharged through the openings 57 in the ends of the spouts 56. The rotation of the shaft 20 causes the plate 37 of the disk 22 to agitate the feed within the space between the front wall of the box and the wall 14 and force some of it over the end of the plate 19 and through the opening 18. The feed falls down the chute 53 into the central pocket 54 of the scattering device 52.

By means of the adjustable connections of the lever 24, and the plate 30 and the link 34, as well as the adjustability of the spring 29 and the cord 40 in the free end of the lever 24, the number of teeth on the ratchet wheel 21, over which the pawl 31 will rotate can be easily gaged. Thus the agitating disk 22 can be made to perform any part of a revolution within a half of a revolution.

It will readily be seen that by this adjustment the amount of feed delivered to the opening 18 by the disk 22 can be accurately gaged.

If desired ratchet wheels having more or less teeth can be substituted for the ratchet wheel 21, and disks of different sizes and styles substituted for the disk 22.

What is claimed is:

1. In a chicken feeding device, a feed containing receptacle having a compartment in the forward portion thereof, a shaft mounted in the compartment, the bottom of said compartment having an outlet opening, a ratchet-wheel mounted in the shaft, a bladed agitating disk mounted on the shaft, a plate loosely mounted on the shaft, a pawl carried by the plate and engaging the ratchet wheel, a lever pivoted on the receptacle, adjustable connections between the pawl carrying plate and the lever for actuation of said plate upon the movement of the lever, a cable connected at one end to the lever, a depressible bar connected to the other end of the cable for actuating the lever for moving the pawl idly over the ratchet wheel, a rotatable scattering device, a clutch member rotatably carried by the scattering device, the intermediate portion of the cable being engaged around the clutch member, and a spring for returning the member to normal position to actuate the agitating disks.

2. In a chicken feeding device, a feed receptacle, a depressible lever actuated by the chickens, a mechanism for delivering feed from the receptacle, including a spring-pressed lever, a cable connected to the said spring-pressed lever and to the depressible lever, a depending shaft mounted below the receptacle, a rotating feed scattering pan mounted on the lower end of the shaft, a laterally projecting pin on the shaft, a sleeve loosely mounted on the shaft and having teeth for engagement with the pin, and a guiding roller mounted on the receptacle, the cable having its intermediate portion engaged with the guiding roller and around the said sleeve, whereby upward movement of the said depressible lever will permit the spring-pressed lever to pull the said cable and cause the simultaneous actuation of the delivering mechanism and the scattering pan.

In testimony whereof, I affix my signature, in the presence of two witnesses.

HARRY J. BECKER.

Witnesses:
RAY M. KIECHEL,
T. J. RUPP.

Copies of this patent may be obtained for five cents each, by addressing the "Commissioner of Patents, Washington, D. C."